(12) United States Patent
Kuchiki

(10) Patent No.: US 9,489,747 B2
(45) Date of Patent: Nov. 8, 2016

(54) IMAGE PROCESSING APPARATUS FOR PERFORMING OBJECT RECOGNITION FOCUSING ON OBJECT MOTION, AND IMAGE PROCESSING METHOD THEREFOR

(71) Applicant: CANON KABUSHIKI KAISHA, Tokyo (JP)

(72) Inventor: Hiroaki Kuchiki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 14/288,136

(22) Filed: May 27, 2014

(65) Prior Publication Data

US 2015/0003676 A1    Jan. 1, 2015

(30) Foreign Application Priority Data

Jun. 28, 2013  (JP) ................................ 2013-136921

(51) Int. Cl.
*G06K 9/00* (2006.01)
*G06T 7/20* (2006.01)

(52) U.S. Cl.
CPC ... *G06T 7/2053* (2013.01); *G06T 2207/10016* (2013.01); *G06T 2207/20224* (2013.01); *G06T 2207/30236* (2013.01)

(58) Field of Classification Search
None
See application file for complete search history.

(56) References Cited

U.S. PATENT DOCUMENTS

| | | | | |
|---|---|---|---|---|
| 5,721,692 A | * | 2/1998 | Nagaya | F41G 7/2226 342/179 |
| 5,751,362 A | * | 5/1998 | Lee | H04N 19/54 348/699 |
| 5,969,772 A | * | 10/1999 | Saeki | H04N 19/142 348/699 |
| 9,274,597 B1 | * | 3/2016 | Karakotsios | G06F 3/012 |
| 2005/0259870 A1 | * | 11/2005 | Kondo | G06T 7/20 382/173 |
| 2008/0123747 A1 | * | 5/2008 | Lee | H04N 19/20 375/240.16 |
| 2009/0067716 A1 | * | 3/2009 | Brown | G06K 9/00597 382/173 |
| 2011/0032414 A1 | * | 2/2011 | Sumiyoshi | H04N 5/2353 348/367 |
| 2011/0235925 A1 | * | 9/2011 | Itoh | G06K 9/00771 382/218 |
| 2011/0243383 A1 | * | 10/2011 | Oyaizu | G06T 7/204 382/103 |
| 2011/0243451 A1 | * | 10/2011 | Oyaizu | G06T 5/50 382/190 |
| 2012/0086729 A1 | * | 4/2012 | Baseley | G06F 3/011 345/633 |
| 2012/0249830 A1 | * | 10/2012 | Tsubaki | G06T 5/008 348/229.1 |
| 2014/0146182 A1 | * | 5/2014 | Endo | H04N 5/23261 348/169 |
| 2014/0147012 A1 | * | 5/2014 | Park | G06T 7/2013 382/107 |

FOREIGN PATENT DOCUMENTS

| | | |
|---|---|---|
| JP | 2006-339803 A | 12/2006 |
| JP | 2010-273183 A | 12/2010 |

* cited by examiner

*Primary Examiner* — Shervin Nakhjavan
(74) *Attorney, Agent, or Firm* — Canon USA, Inc. I.P. Division

(57) ABSTRACT

An image processing apparatus includes a detection unit configured to detect areas that have changed between a plurality of images, a calculation unit configured to calculate movement vectors for respective areas on the plurality of images, an estimation unit configured to estimate areas where a moving object exists in the plurality of images by using the movement vectors for respective areas calculated by the calculation unit, and information about the motion of an imaging unit, which captured the plurality of images, in the plurality of images, and an identification unit configured to identify moving object areas based on the changed areas detected by the detection unit, and the areas where a moving object exists estimated by the estimation unit.

19 Claims, 11 Drawing Sheets

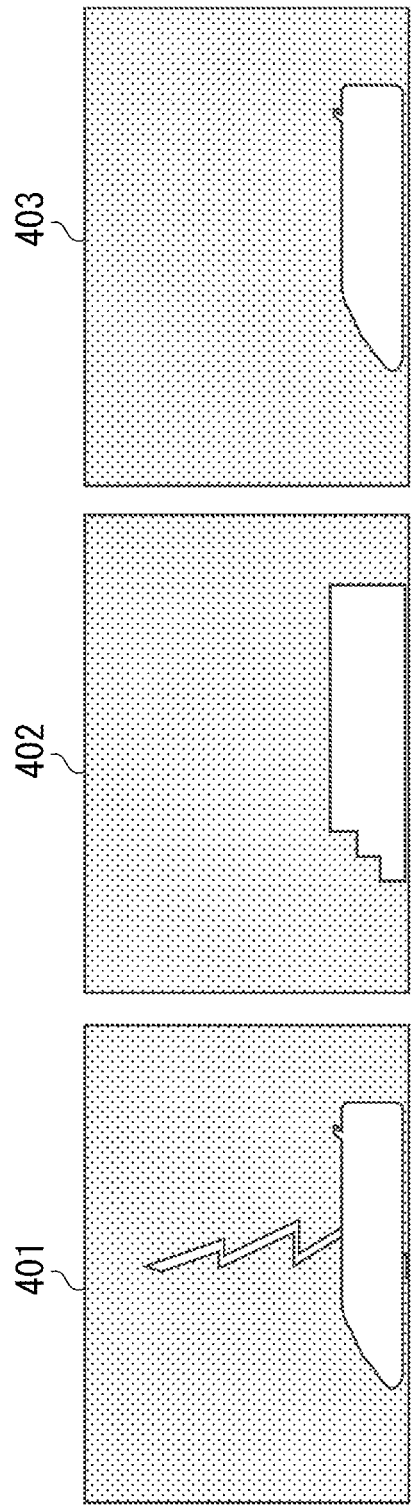

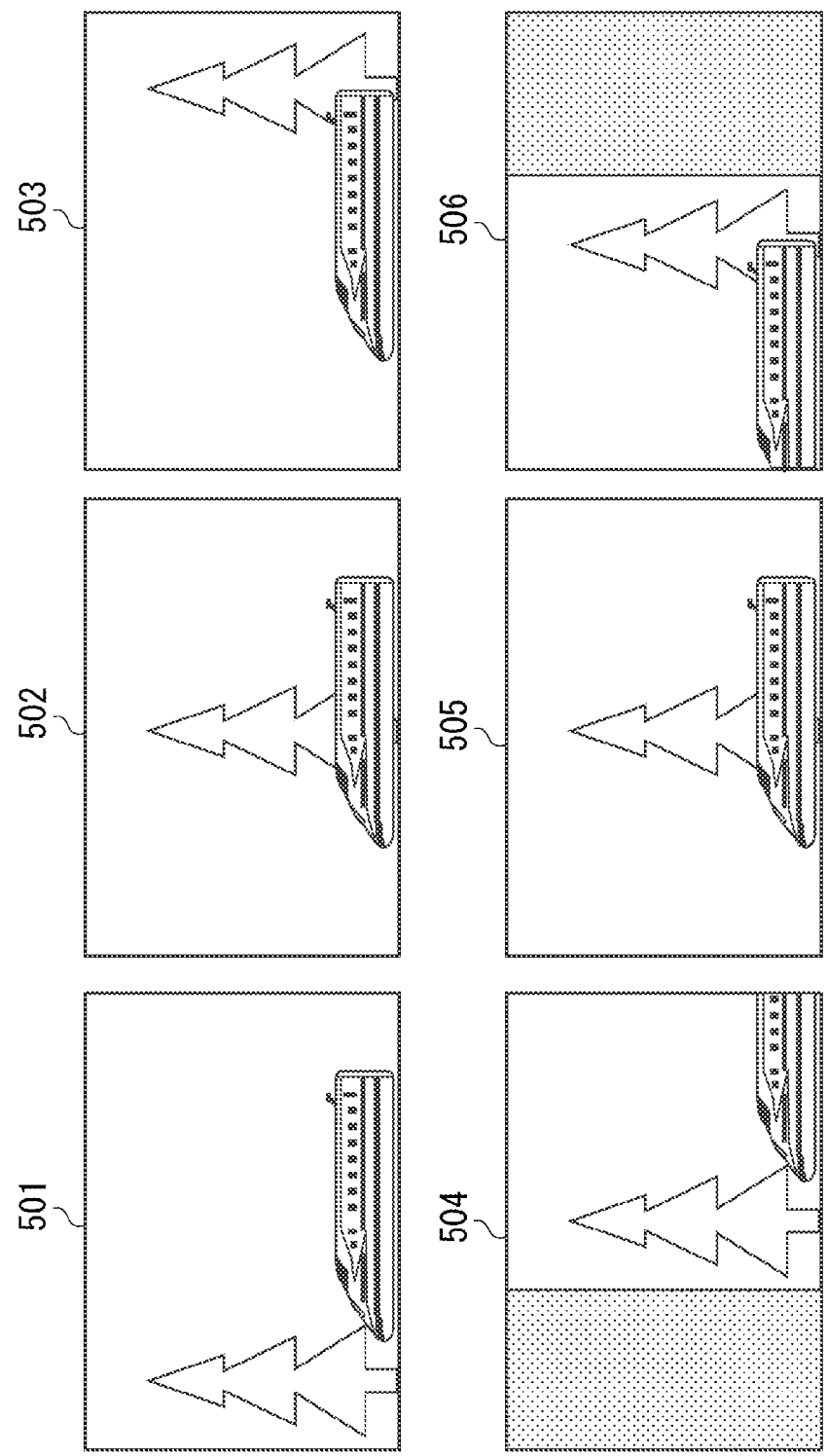

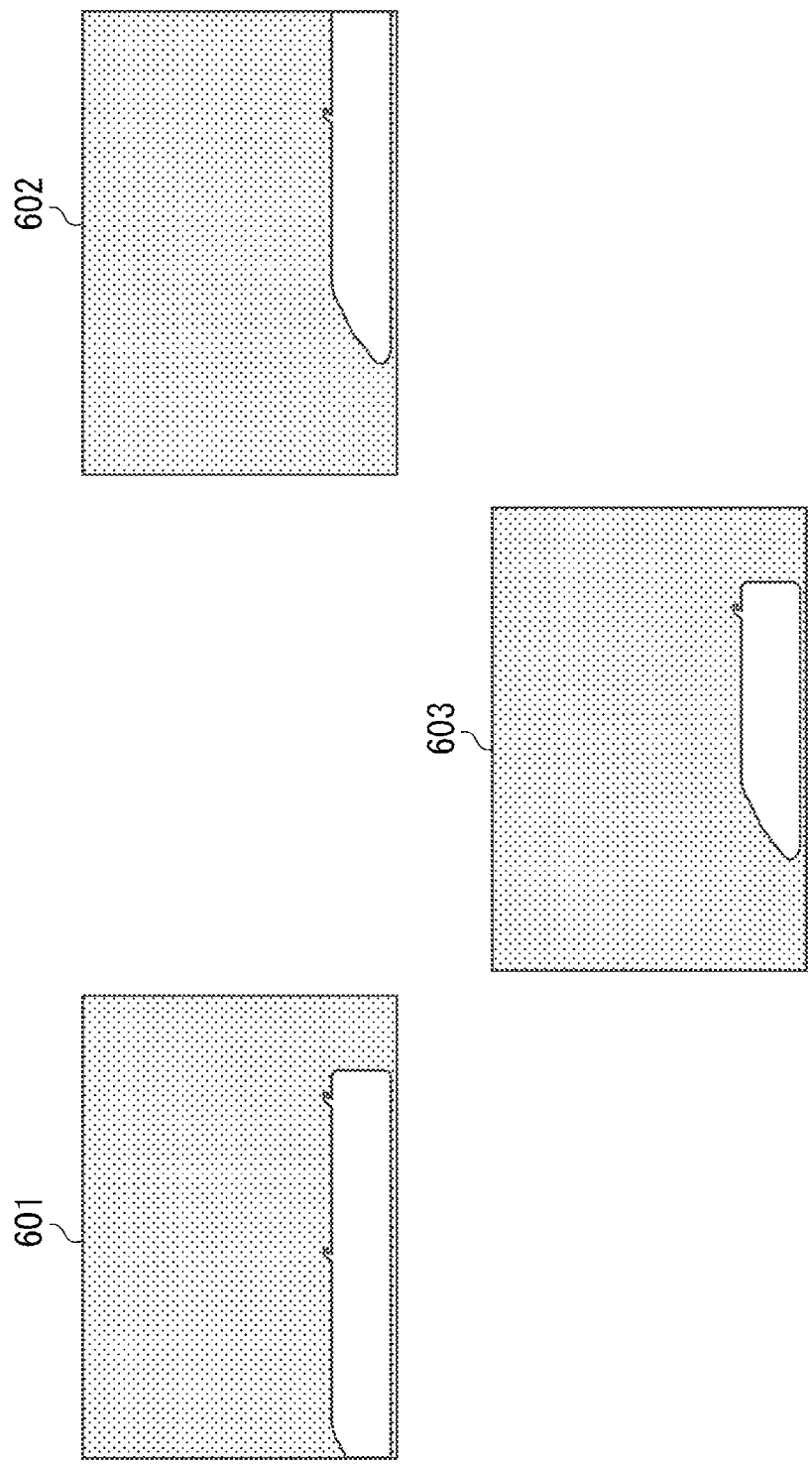

IMAGE PROCESSING APPARATUS FOR PERFORMING OBJECT RECOGNITION FOCUSING ON OBJECT MOTION, AND IMAGE PROCESSING METHOD THEREFOR

BACKGROUND OF THE INVENTION

1. Field of the Invention

The present invention relates to an image processing apparatus, and more particularly to object recognition, focusing on the motion of an object.

2. Description of the Related Art

Panning shot is a shooting technique for expressing the sense of speed caused by a moving object. An object of the above-described shooting technique is to capture an image of the moving object in such a way that the background flows while the object is at rest in the captured image. To take a panning shot, a photographer pans a camera in synchronization with the motion of the object. In general panning shot, the shutter speed is adjusted to a slower speed than usual according to the moving speed of the object (main object). However, because of the slow shutter speed, even the main object is often blurred by the effect of camera-shake and the difference between the moving speed of the main object and the panning speed. In view of the above-described problem, there is a demand for facilitating panning shot by using an image processing technique.

For example, Japanese Patent Application Laid-Open No. 2006-339803 discusses an imaging apparatus which arbitrarily sets a reference area for main object capturing, identifies a main object based on a positional relationship between each piece of image data and the reference area, and combines a plurality of images through position adjustment with reference to the identified main object. Japanese Patent Application Laid-Open No. 2010-273183 discusses an imaging apparatus which detects moving objects based on movement vectors between images and the camera motion, identifies a main object from among the detected moving objects based on information for main object identification, and applies the effect of panning shot to areas other than the main object.

However, in the above-described conventional technique discussed in Japanese Patent Application Laid-Open No. 2006-339803, since it is necessary to set a reference area for main object capturing, a main object may not be captured if it exists in areas other than the reference area. Further, to capture an image in a desired composition, pre-processing such as reference area presetting is required.

SUMMARY OF THE INVENTION

The present invention is directed to providing an image processing apparatus which achieves high-accuracy object recognition in image capturing using an imaging apparatus in motion.

The image processing apparatus according to the present invention includes a detection unit, a calculation unit, an estimation unit, and an identification unit. The detection unit is configured to detect areas that have changed between a plurality of images. The calculation unit is configured to calculate movement vectors for respective areas on the plurality of images. The estimation unit is configured to estimate areas where a moving object exists in the plurality of images by using the movement vectors for respective areas calculated by the calculation unit, and information about the motion of an imaging unit, which captured the plurality of images, in the plurality of images. The identification unit is configured to identify moving object areas based on the changed areas detected by the detection unit, and the areas where a moving object exists estimated by the estimation unit.

Further features of the present invention will become apparent from the following description of exemplary embodiments with reference to the attached drawings.

BRIEF DESCRIPTION OF THE DRAWINGS

FIG. 4 illustrates position adjustment on the background according to the first exemplary embodiment.

FIG. 5 illustrates difference area detection according to the first exemplary embodiment.

FIG. 6 illustrates a background movement amount calculation method according to the first exemplary embodiment.

DESCRIPTION OF THE EMBODIMENTS

Various exemplary embodiments, features, and aspects of the invention will be described in detail below with reference to the drawings.

Figure 1:
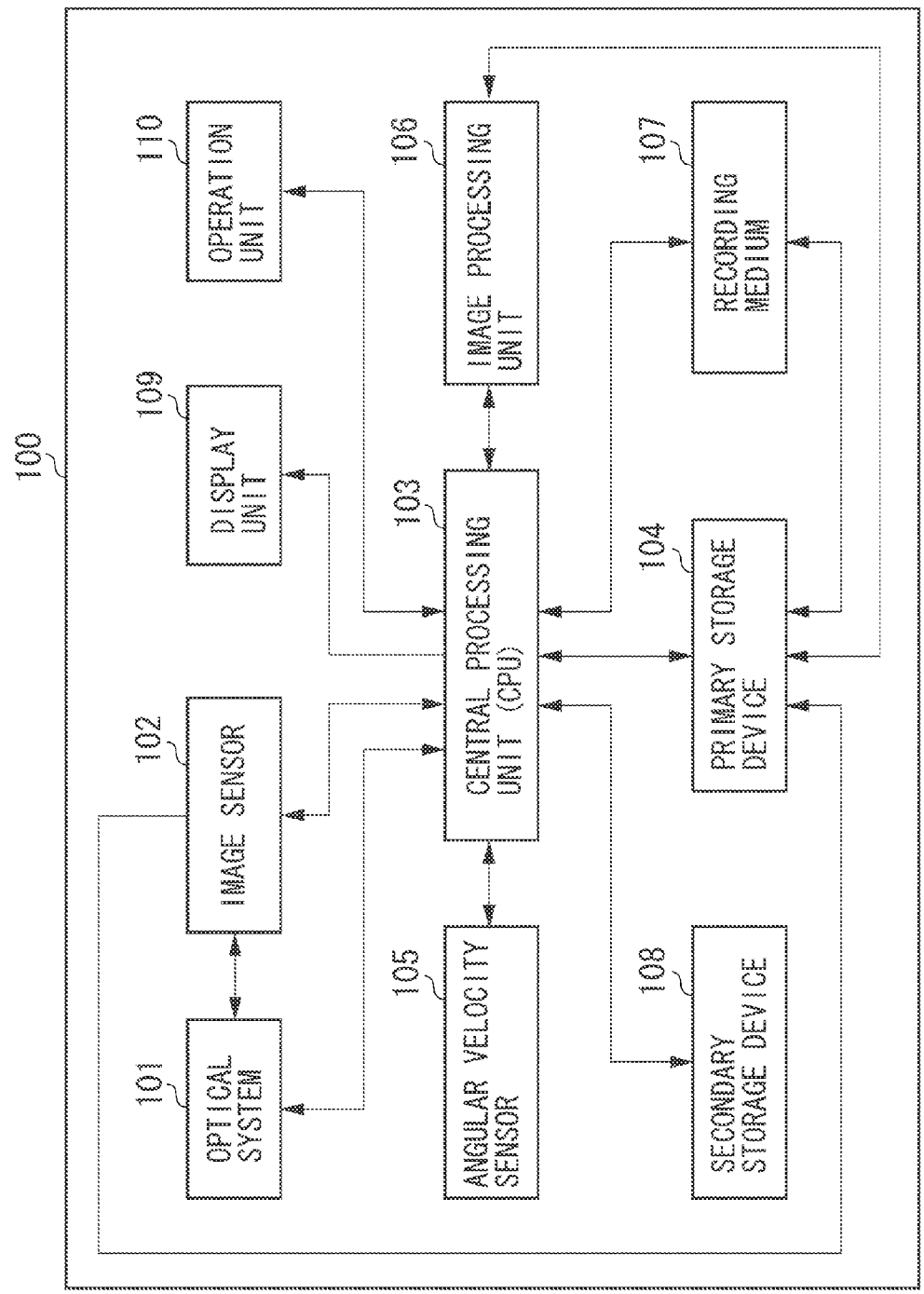
FIG. 1 illustrates a basic configuration of an imaging apparatus according to a first exemplary embodiment.

FIG. 1 is a block diagram illustrating an imaging apparatus as an exemplary image processing apparatus according to a first exemplary embodiment of the present invention.

An imaging apparatus 100 may be not only a camera, such as a digital camera and a digital video camera, but also an arbitrary electronic apparatus having an imaging function, such as a camera-function-equipped mobile phone, a camera-equipped computer, and a scanner. A part or whole of the imaging apparatus 100 according to the present exemplary embodiment can be considered as the image processing apparatus according to the present exemplary embodiment. The image processing apparatus does not necessarily have an imaging function, and may have only a function of processing an image output from an image sensor 102 or an image stored in each storage device.

An optical system 101 includes a lens, a shutter, and a diaphragm. The optical system 101 guides a light flux from an object to the image sensor 102 to form an optical image of the object on the image sensor 102. Then, the optical system 101 transmits information, such as the focal length, the shutter speed, and the diaphragm value, to a CPU 103.

The image sensor 102 converts the optical image formed by the optical system 101 into an electrical signal. A charge coupled device (CCD) image sensor and a complementary metal oxide semiconductor (CMOS) image sensor are applicable as the image sensor 102. Then, the electrical signal is converted into digital form by an analog-to-digital (AD) converter, and stored in a primary storage device 104. Although, in the present exemplary embodiment, the pixel array of the image sensor 102 is the Bayer array having red, green, and blue (RGB) pixels, the present invention is not limited thereto. For example, the image sensor 102 may be provided with a complementary color filter pixel array, or functional pixels for the purpose of colorimetry and distance measurement in addition to the above-described imaging pixels. The electrical gain (hereinafter referred to as International Organization for Standardization (ISO) sensitivity) of the image sensor 102 is set by the CPU 103.

An angular velocity sensor 105, such as a gyro sensor, detects vibration (camera movement, camera shake), converts it into an electrical signal, and transmits the signal to the CPU 103.

The CPU 103 which functions as a control unit controls each unit constituting the imaging apparatus 100 according to an input signal and a prestored program, thus implementing each function of the imaging apparatus 100. In the following descriptions, at least a part of the function implemented when the CPU 103 executes a program may be implemented by dedicated hardware, such as an application specific integrated circuit (ASIC).

The primary storage device 104 is a volatile memory, such as a random access memory (RAM), and is used as a working memory for the CPU 103. Information stored in the primary storage device 104 is used by the image processing unit 106, or recorded in a recording medium 107.

A secondary storage device 108 is, for example, a nonvolatile storage, such as an electrically erasable programmable read only memory (EEPROM). The secondary storage device 108 stores programs (firmware) and various setting information for controlling the imaging apparatus 100, and is used by the CPU 103.

The recording medium 107 records image data acquired by image capturing and stored in the primary storage device 104. The recording medium 107 can be detached from the imaging apparatus 100, such as a semiconductor memory card, and the recorded data can be read by other apparatuses, such as a personal computer. Specifically, the imaging apparatus 100 has a mechanism for attaching and detaching the recording medium 107, and a function of reading and writing the recording medium 107.

A display unit 109 has a function of displaying information stored in the primary storage device 104 for display, in response to an instruction of the CPU 103. In the present exemplary embodiment, the display unit 109 has a live view (view finder) display function for sequentially displaying at least a part of images continuously acquired from the image sensor 102. The display unit 109 further has a function of displaying a graphical user interface (GUI) for reproducing images shot and recorded on the recording medium 107 and performing interactive operations.

The operation unit 110 includes input devices for receiving user operations and transmitting input information to the CPU 103, such as buttons, levers, and a touch panel. The operation unit 110 may include input devices using voice and sight line. In the imaging apparatus 100 according to the present exemplary embodiment, the image processing apparatus 106 has a plurality of patterns of image processing to be applied to captured images, and can set the pattern from the operation unit 110 as a shooting mode.

The image processing unit 106 performs not only image processing, what is called development processing, but also color tone adjustment according to the shooting mode. The above-described processing includes, for example, interpolation processing (such as demosaicing processing), white balance adjustment processing, aberration and distortion correction processing, sharpness adjustment processing, gamma correction processing, matrix calculation, and color conversion processing based on a lookup table. The image processing unit 106 further performs display processing (such as resizing and gamma conversion) for display on the display unit 109, and recording processing (such as coding and compression) at the time of recording on the recording medium 107. The image processing unit 106 further performs processing for generating a panning shot image according to the present exemplary embodiment. A plurality of images to be combined and image data generated during the above-described processing are stored, for example, in the primary storage device 104. At least a part of functions of the image processing unit 106 can be implemented based on software by the CPU 103.

Figure 2:
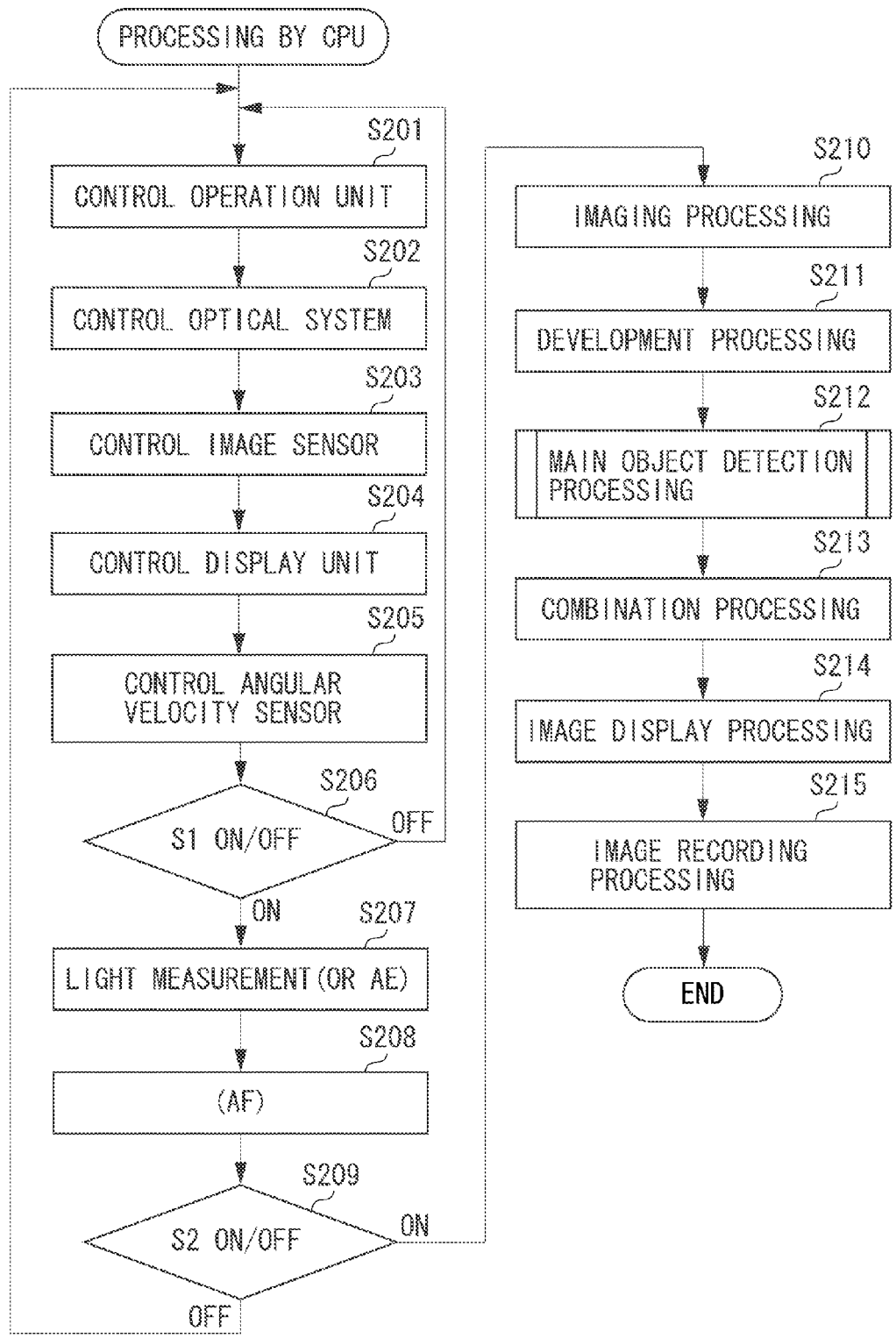
FIG. 2 is a flowchart illustrating processing of a central processing unit (CPU) according to the first exemplary embodiment.

FIG. 2 is a flowchart illustrating processing for image capturing and recording in the panning shot mode performed by the CPU 103.

In the present exemplary embodiment, image capturing and image recording are instructed in two steps. Hereinafter, the operation unit 110 inputs an instruction S1 for imaging preparation and an instruction S2 for image capturing and recording. In the present exemplary embodiment, the instruction S1 corresponds to a half press of the shutter button of the operation unit 110, and the instruction S2 corresponds to a full press of the shutter button thereof, which can be input by a user. When the operation unit 110 is a touch panel, touch operations on the touch panel may be changed, and an arbitrary operation can be assigned to the instructions S1 and S2.

In step S201, the CPU 103 receives a user input from the operation unit 110.

In step S202, the CPU 103 adjusts settings of the optical system 101, such as the focal length, the shutter speed, and the diaphragm value, based on input information.

In step S203, the CPU 103 adjusts settings of the image sensor 102, such as the ISO sensitivity, based on the input information.

In step S204, the CPU 103 displays information about changed settings on the display unit 109 to present the information to the user.

In step S205, the CPU 103 receives information about the angular velocity of the imaging apparatus 100 detected by the angular velocity sensor 105. Constantly performing step S205 as well as steps S202 and S203 enables embedding the information about the angular velocity, as image information, together with the information about the focal length, the shutter speed, the diaphragm value, the ISO sensitivity, etc. This also enables reprocessing captured images in a camera, and post-processing them by using a personal computer (PC) application. The information about the angular velocity to be recorded may be the angular velocity itself, the movement angle between images, or the angular displacement therebetween.

The order of steps S201 to S205 is not limited thereto, and may be freely arranged according to processing.

In step S206, the CPU 103 determines whether the instruction S1 of the operation unit 110 is input (ON/OFF). When the instruction S1 is not input (OFF in step S206), the CPU 103 repeats the processing in steps S201 to S205.

When the instruction S1 of the operation unit 110 is input (ON in step S206), the processing proceeds to step S207. Processing in step S207 and subsequent steps will be described below.

In step S207, the CPU 103 measures exposure by using a light metering sensor included in the optical system 101. In the auto exposure (AE) mode in which automatic exposure control is performed, the CPU 103 automatically adjusts exposure by using the shutter speed, the diaphragm value, and the ISO sensitivity.

In step S208, in the auto focus (AF) mode in which automatic focus adjustment control is performed, the CPU 103 measures the object distance by using a distance measuring sensor included in the optical system 101 or disposed in the image sensor 102, and performs focus adjustment based on the defocus amount.

The order of steps S207 and S208 is not limited thereto, and may be freely arranged according to processing.

In step S209, the CPU 103 determines whether the instruction S2 of the operation unit 110 is input (ON/OFF). When the instruction S2 of the operation unit 110 is not input (OFF in step S209), the CPU 103 repeats the processing in steps S201 to S208. Alternatively, in step S209, the CPU 103 may determine whether the instruction S1 of the operation unit 110 is continued, and, when the instruction S1 of the operation unit 110 is not input (OFF in step S209), the processing returns to step S201.

When the instruction S2 of the operation unit 110 is input (ON in step S209), the processing proceeds to step S210. Processing in step S210 and subsequent steps will be described below.

In step S210, upon reception of the imaging instruction S2 from the control unit 10, the CPU 103 captures the number of images required for panning shot processing. In the present exemplary embodiment, "imaging" means a series of operations in steps S210 to S215 for capturing images by fully pressing the shutter button (instruction S2) and recording the captured images. In the panning shot mode, it is assumed that the user captures an image by panning the imaging apparatus 100 (or a part thereof including the image sensor 102) to obtain the effect of panning shot. The number of images used for panning shot may be preset by the user, or automatically calculated based on settings, such as the main object speed, the amount of panning, and the degree of background area blurring.

In step S211, the image processing unit 106 performs the above-described development processing on the image data captured in step S210.

In step S212, the CPU 103 performs main object area detection processing, and position adjustment processing in the detected main object areas. The main object areas according to the present exemplary embodiment refer to object areas detected distinctively from the background area (described below) in a captured image. The main object areas may include a plurality of persons. In the present exemplary embodiment, areas where a moving object is captured (moving object areas) are detected as main object areas for panning shot. This means that objects at rest (stationary objects) out of a plurality of captured images will be handled as the background. However, as described above, when panning shot is assumed, as a result of comparison between captured images, an object which moves in the reverse direction of the panning direction corresponding to the amount of panning is a stationary object in the original state. Specifically, a stationary object appears to be moving by the amount of panning. An object which moves by the amount of panning or the amount close to it in the panning direction is determined to be a moving object. Details will be described below. When shooting with the camera fixed on a tripod is assumed, areas where a large motion vector can be detected are considered to be main object areas.

In step S213, after position adjustment of the plurality of images to match the main object areas by the image processing unit 106 in step S212, the CPU 103 combines the plurality of images to generate a combined image as a panning shot image. A plurality of methods is conceivable as a method for generating a combined image having a similar visual effect to panning shot.

The CPU 103 performs blurring processing (filtering processing) on the background area including a plurality of captured images by the amount of blurring (number of taps) based on the movement amount of the background between the images. The CPU 103 performs position adjustment to match the main object areas on the plurality of captured images, and combines them by using the addition average. The movement amount of the background can be calculated based on the angular velocity obtained by the angular velocity sensor 105. The processing is not limited thereto. It is also possible to perform position adjustment of the plurality of captured images to match the main object areas, adds the images to generate a combined image, and performs blurring processing on the main object area of the combined image, i.e., the background area other than the moving object areas where a moving object exists. It is also possible to further combine the blurred combined image with the pre-blurring image to generate a final combined image.

In step S214, the CPU 103 displays on the display unit 109 image data generated through the display processing performed on the combined image data generated in step S213 and the original pre-combination image data by the image processing unit 106.

In step S215, the CPU 103 records on the recording medium 107 the image data generated through the recording processing (such as coding and compression) performed on the combined image data generated in step S213 and the original pre-combination image data. In the present exemplary embodiment, recording of RAW images without development processing, and recording of joint photographic experts group (JPEG) images conforming to a relevant standard can be set as recorded image settings. Depending on these settings, neither the development in step S211 nor the image recording processing in step S215 may be applied.

Although, in the present exemplary embodiment, the main object detection processing in step S212 and the panning shot combination processing in step S213 are performed on the images after the development processing in step S211, the processing is not limited thereto. Each piece of processing is also applicable to the pre-development images.

The main object detection processing in step S212 will be described below with reference to the flowchart illustrated in FIG. 3A.

In step S301, to detect areas that have changed between a plurality of images, the CPU 103 generates difference images by using difference absolute values between images to detect difference areas. The processing in step S301 will be described in detail below. As long as areas that have changed between images can be detected, a detection method other than the one used in step S302 (described below) may be used.

In step S302, the CPU 103 identifies movement vectors of the main object by using the angular velocity detected by the angular velocity sensor 105 and movement vectors (motion vectors) calculated based on the images, and detects areas having an equivalent movement vector to the main object (moving object). The processing in step S302 will be described in detail below.

In step S303, by using the main object vector areas detected in step S302, the CPU 103 extracts main object areas from among the moving object areas detected in step S301. Specifically, in the present exemplary embodiment, the CPU 103 compares the pixel value of a main object vector area with the corresponding pixel value of a moving object area, and detects as a main object area an area having a pixel value acquired based on the result of the comparison equal to or larger than a predetermined value. Although, in present exemplary embodiment, the CPU 103 compares both areas for each pixel value, the processing is not limited thereto. The CPU 103 may compare representative values, such as average values, for each predetermined pixel group, to detect a main object area. Instead of the comparison of pixel values or representative values of pixel groups, the average value of pixel values or representative values of pixel groups may be obtained. Specifically, as long as main object areas are determined in consideration of both the difference areas and the main object areas, any method of consideration may be used.

FIG. 4 illustrates areas obtained by the processing in steps S301 to S303. In step S301, the CPU 103 obtains a main object area map as illustrated by an image 401 based on difference areas. In step S302, the CPU 103 obtains a main object area map as illustrated by an image 402 based on main object vectors. In step S303, the CPU 103 obtains a main object area map as illustrated by an image 403. Images 501, 502, and 503 illustrated in FIG. 5 are main object area maps in which areas corresponding to main object areas detected by each detection method are set to a high signal value (white) and other areas are set to zero.

Figure 3A:
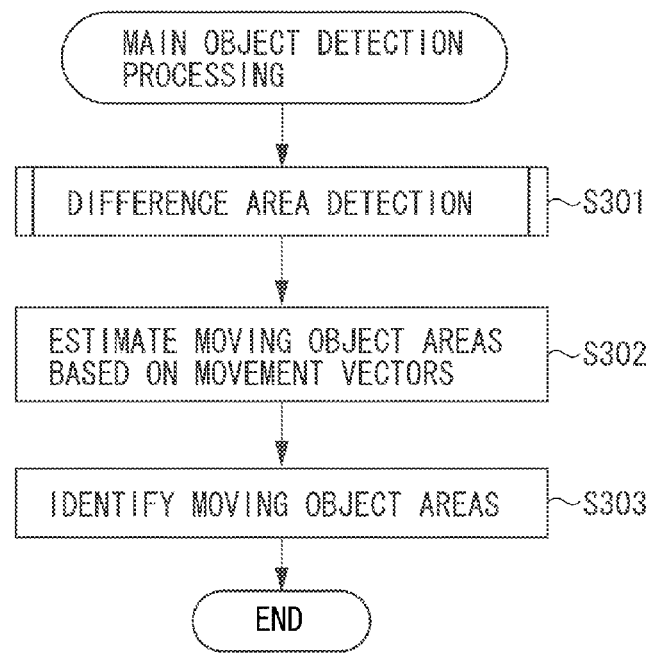
FIGS. 3A, 3B, and 3C are flowcharts illustrating difference area detection according to the first exemplary embodiment.
Figure 3B:
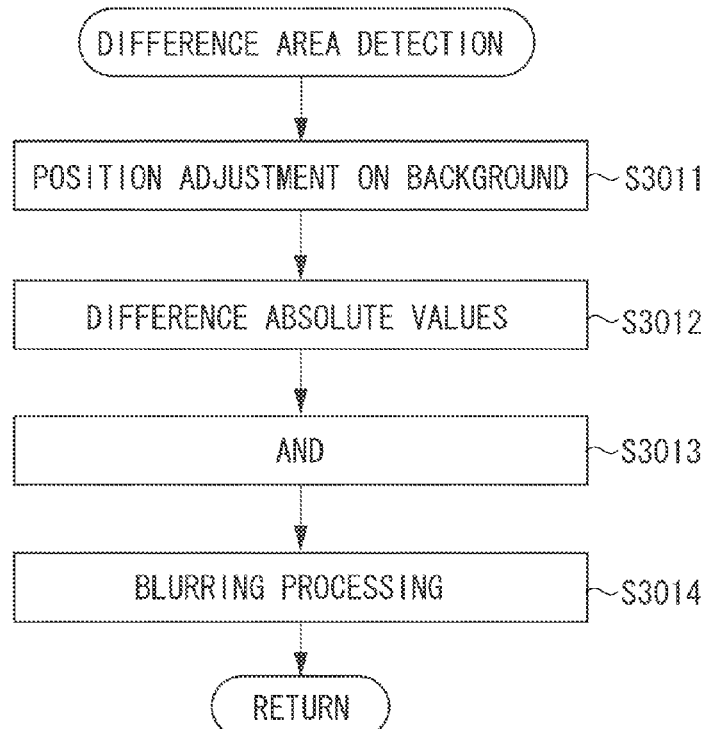

FIG. 3B is a flowchart illustrating details of the difference area detection processing performed in step S301. In the present exemplary embodiment, it is assumed that the luminance (Y) signal after development is used as pixel values for each image. However, it is also possible to perform similar processing on the color difference (UV) signal and combine the result of the processing, or convert the YUV signal after development into the RGB signal and combine the result of detection for each color signal. The above-described modification for pixel values for each image is also applicable to main object vector area detection processing and main object area detection processing (described below).

The difference area detection processing requires at least two images. In the present exemplary embodiment, difference areas are detected by using three different images.

In step S3011, the CPU 103 arranges in time series three images acquired while the user is panning the imaging apparatus 100, and performs position adjustment on the first and the third images with reference to the background of the second image (intermediate image). FIG. 5 illustrates exemplary position adjustment performed on the images 501, 502, and 503 with reference to the background. As a result of the position adjustment, images 504, 505, and 506 are generated, respectively. The position adjustment method will be described in detail below.

In step S3012, the CPU 103 performs processing on the three images that completed position adjustment. Specifically, the CPU 103 obtains an image of difference absolute values between the first and the second images, and an image of difference absolute values between the second and the third images.

In step S3013, the CPU 103 performs AND operation on the obtained two images of difference absolute values.

FIG. 6 illustrates results of performing the processing in steps S3012 and S3013 on the images 504 to 506 illustrated in FIG. 5. Specifically, an image 601 is the result of obtaining difference absolute values between the images 504 and 505, an image 602 is the result of obtaining difference absolute values between the images 505 and 506, and an image 603 is the result of performing AND operation on the images 601 and 602.

In step S3014, the CPU 103 performs blurring processing, such as filtering, on the result of the above-described AND operation via the image processing unit 106. The CPU 103 performs this processing to apply different corrections on the main object and the background to smooth boundary between the main object and the background in consideration of the case of image combination. Therefore, step S3014 can be omitted as required.

The above-described steps S3011 to S3014 perform the difference area detection in step S301. Separation of the stationary object (background) is desirably completed through the difference area detection. However, actually, separation may not be successfully completed because of some causes. For example, if the background contains a repetitive pattern or if the background is distorted by lens distortion, absolute values which are larger than a predetermined value may be obtained. Therefore, main object areas can be detected with higher accuracy by limiting areas detected as differences in difference areas to object vector areas (described below).

The position adjustment method performed in step S3011 will be described in detail below with reference to FIG. 7 and formula (1).

Figure 7:
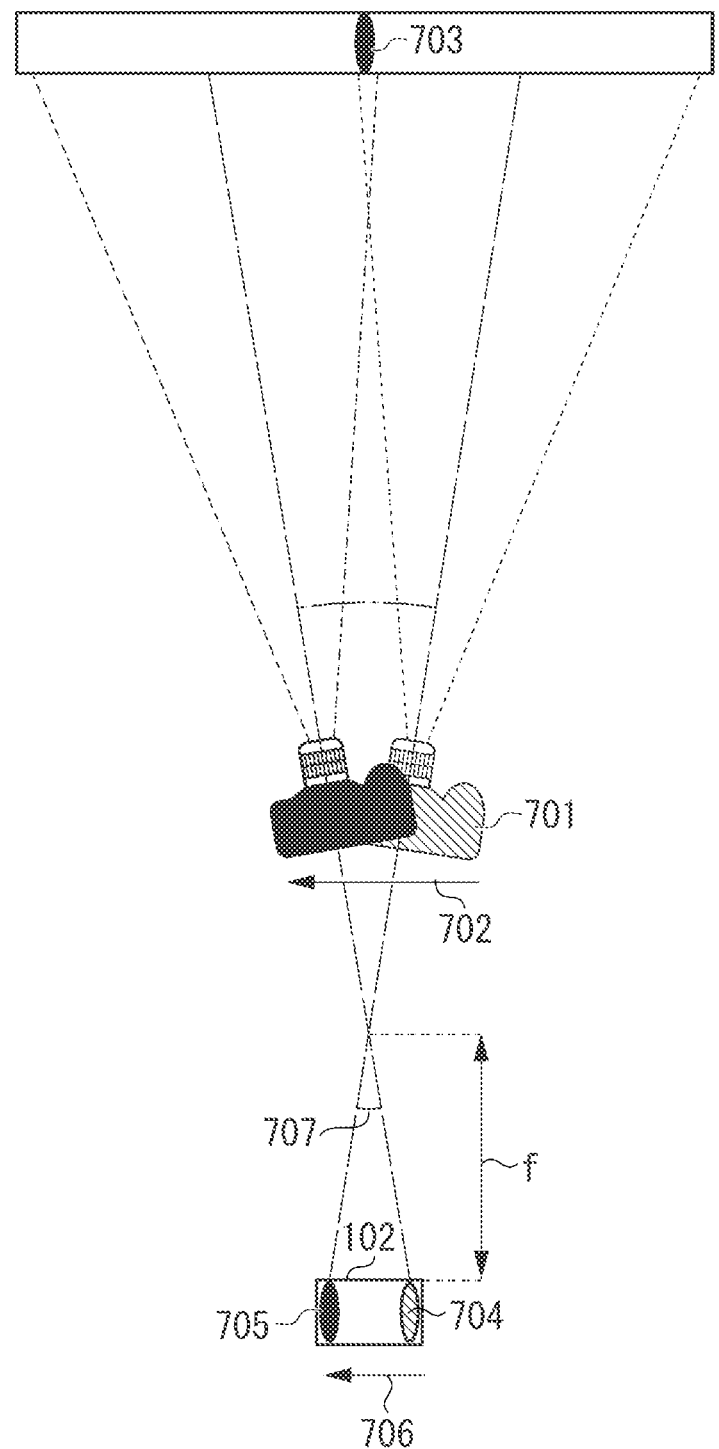
FIG. 7 illustrates main object vector calculation according to the first exemplary embodiment.

FIG. 7 illustrates how the background moves on the imaging plane when the user pans the camera.

When the user pans a camera 701 as illustrated by an arrow 702 and captures a stationary object 703, the stationary object 703 moves from a position 704 to a position 705 on the image sensor 102.

The movement amount of the stationary object 703 on the image is calculated by using formula (1).

$$\text{Movement amount} \approx \frac{f \tan\left[\sum_n \left(-\frac{\omega}{fps}\right)\right]}{pp} \quad \text{[Formula 1]}$$

f [mm]: Focal length
ω[rad/sec]: Angular velocity
fps [frame/sec]: Frame rate
n [frame]: Number of image existing between images to be sampled
pp [mm/pixel]: Pixel pitch
... (1)

As illustrated in formula (1), a movement amount 706 of the stationary object 703 (background) can be calculated based on the movement angle 707 of the imaging apparatus 701 produced by panning, and the focal length (f) of a lens 101.

The movement angle 707 is calculated by using the angular velocity (ω) of the imaging apparatus 701 detected by the angular velocity sensor 105, the frame rate (fps), and the number of images existing between images to be sampled (n).

Finally, converting the movement amount 706 of the background into the number of pixels by using the pixel pitch (pp) enables calculating the movement amount of the background in an image. Then, moving portions other than a reference image based on the calculated movement amount enables performing position adjustment.

The movement angle 707 may be correctly calculated each time based on the angular velocity corresponding to each image, or collectively calculated based on the average angular velocity of all images.

In step S301 illustrated in FIG. 3A, as a result of the above-described processing, difference areas as illustrated by the image 401 in FIG. 4 are obtained. In the image 401, the white area indicates a moving object area. Although moving object areas in an ideal environment are as illustrated by the image 403, difference areas as illustrated by the image 401 are often detected in the real environment. The difference area 401 shows the effect of image distortion resulting from the changing incident angle of the object during panning, and the effect of moving objects other than the main object. In the three images used in step S301, more remarkable changes between them make it easier to detect moving object areas. Therefore, when a plurality of images is continuously captured, for example, it is preferable to use the first and the last images, and intermediate images captured between the first and the last images.

When calculating difference areas by using two images, the step for performing AND operation is omitted from the above-described steps.

In the above-described exemplary embodiment, the CPU 103 detects the movement amount of the background in the captured images, i.e., motion information corresponding to information from a sensor for detecting the motion of the imaging unit, based on the output of the angular velocity sensor 105. However, the movement amount of the background can also be detected by using other known sensors, such as an infrared sensor and an acceleration sensor. The movement amount of the background can also be obtained by identifying movement vectors corresponding to the background based on movement vectors between images (described below). Further, it is also preferable to calculate the final movement amount of the background by calculating the weighted average value of movement amounts of the background acquired from the above-described plurality of units.

Figure 3C:
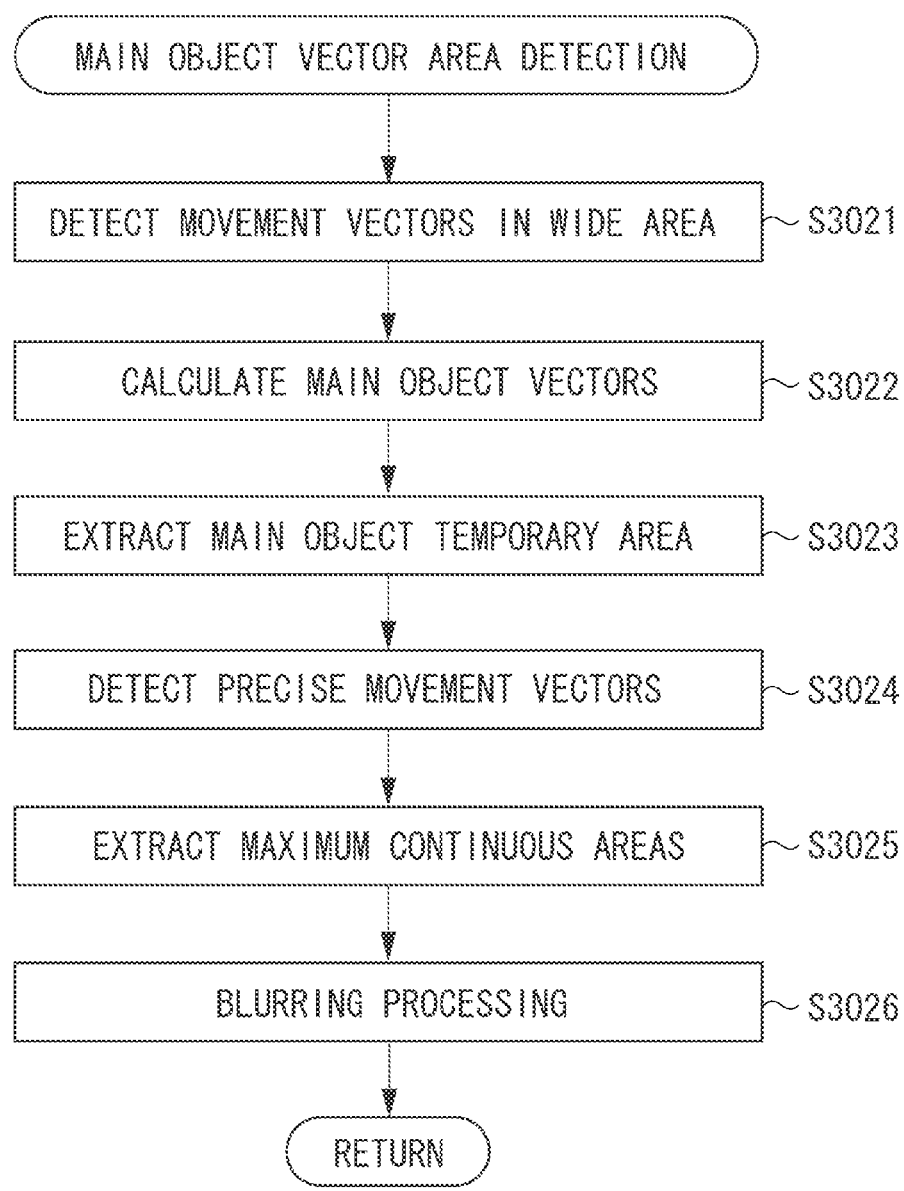
Figure 8:
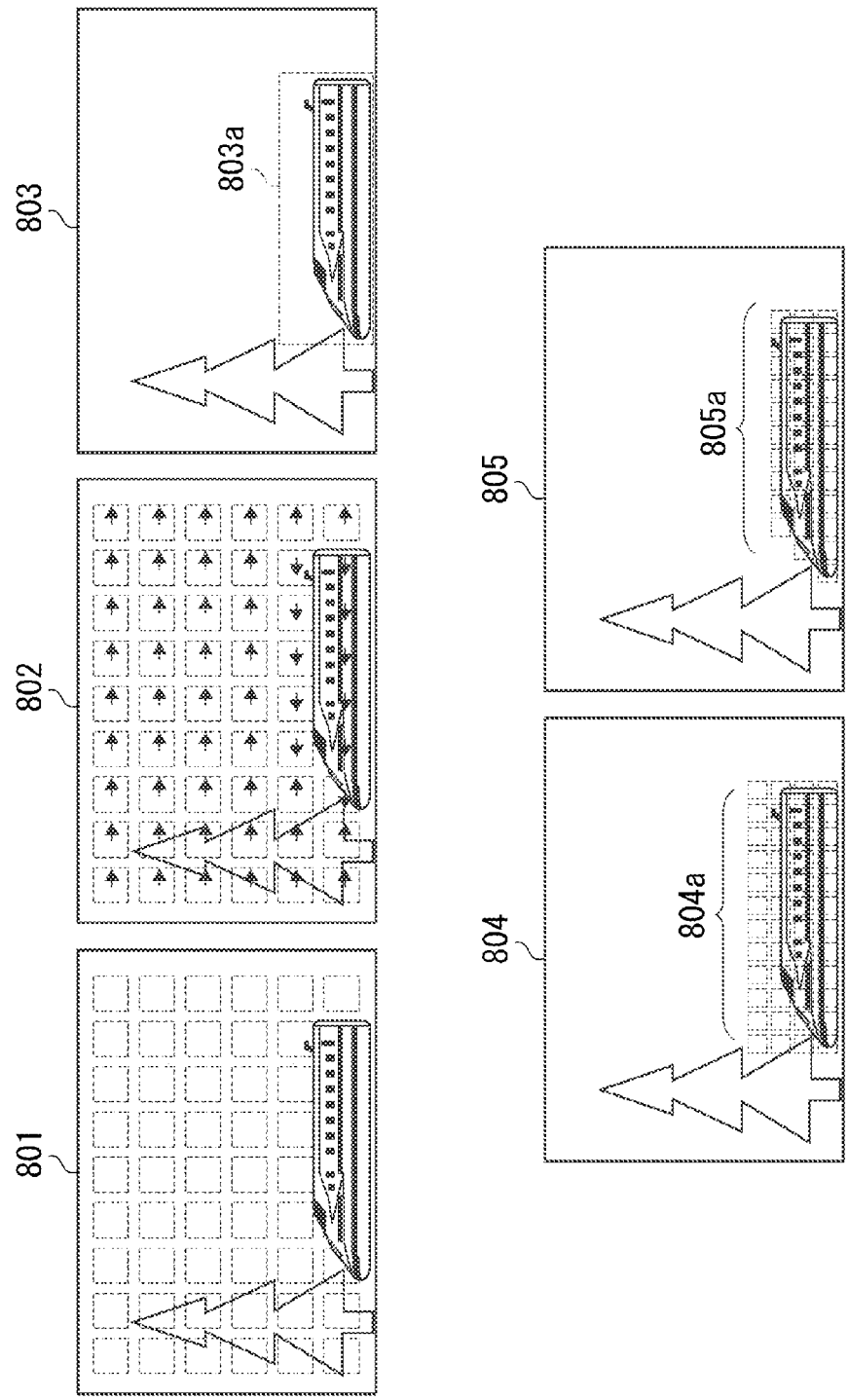
FIG. 8 illustrates main object vector area detection according to the first exemplary embodiment.

FIG. 3C is a flowchart illustrating details of the moving object area estimation processing performed in step S302 illustrated in FIG. 3A. FIG. 8 illustrates the processing in steps S3021 to S3025.

In step S3021, the CPU 103 sets search areas for movement vector detection to areas corresponding to a plurality of images, as illustrated by an image 801 in FIG. 8, and detects movement vectors for respective areas between images, as illustrated by an image 802 in FIG. 8. A known method can be used as a method for calculating movement vectors. For example, as illustrated by the image 802 in FIG. 8, the CPU 103 obtains the sum of absolute differences for each area, and connects corresponding points so that the sum of absolute differences is minimized, to derive a movement vector for the relevant area.

Figure 9:
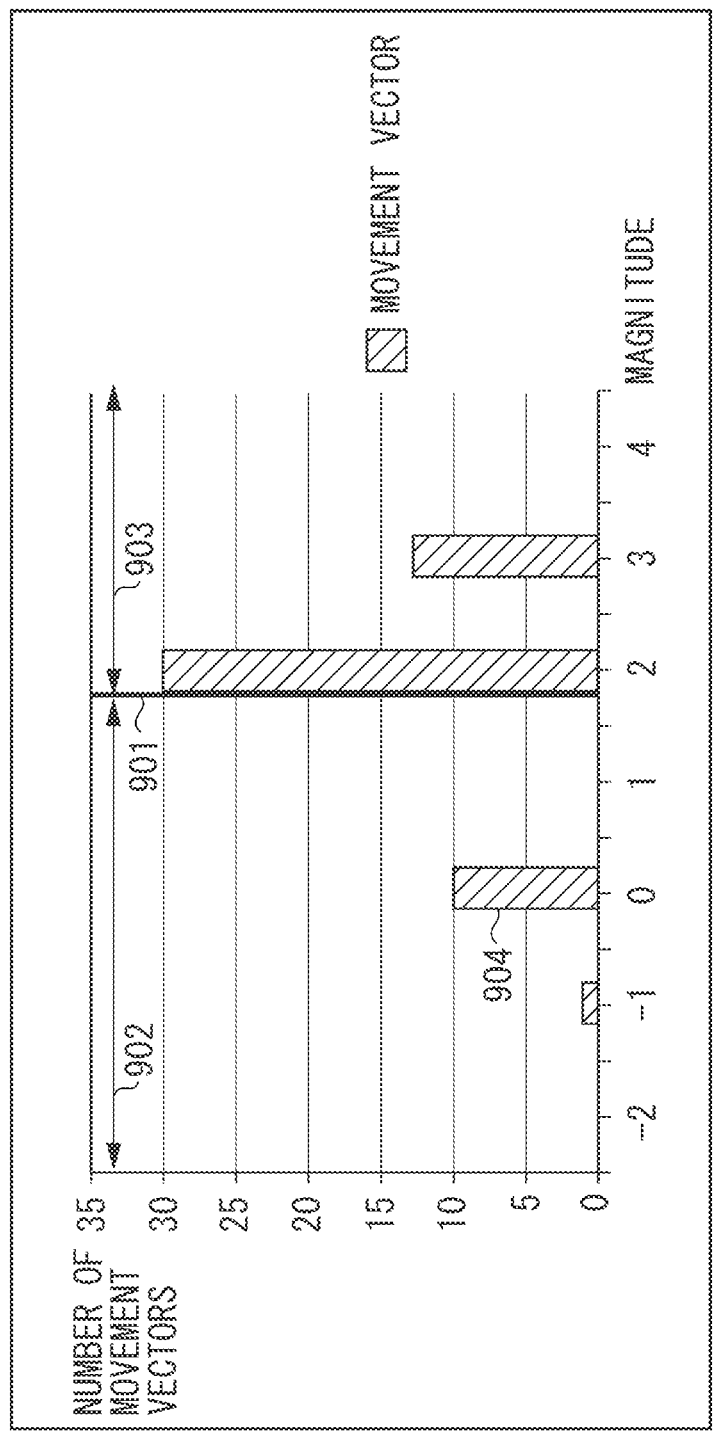
FIG. 9 illustrates main object area detection according to the first exemplary embodiment.

In step S3022, the CPU 103 calculates movement vectors (hereinafter referred to as main object vectors) of the main object from among the detected movement vectors. FIG. 9 is a graph illustrating a histogram of movement vectors between images. The horizontal axis is assigned the magnitude of movement vectors, and the vertical axis is assigned the number of movement vectors (frequency) having the same magnitude. The magnitude 0 on the horizontal axis distinguishes the direction of movement vectors. The CPU 103 calculates a background movement amount 901 based on the image shake (i.e., information corresponding to the motion of the imaging unit between a plurality of images) calculated in step S3021. Then, based on the background movement amount 901, the CPU 103 classifies the movement vectors into main object components 902 separated from the background movement amount 901 and background components 903 in the vicinity of the background movement amount 901, as illustrated in FIG. 9. Then, movement vectors having the largest number among the main object components 902 are referred to as main object vectors 904. The main object and background components can also be classified based on the histogram of movement vectors without using the information about the camera movement calculated in step S3021. In this case, if the main object exists almost in the vicinity of the center in each image in panning shot, areas corresponding to movement vectors having a size of nearly zero collectively existing in continuous areas in each image are considered to be main object areas. However, since movement vectors may be erroneously detected depending on the size of search areas for movement vectors, the main object and background components can be classified with higher accuracy by referencing the camera movement information as in the above-described exemplary embodiment.

In step S3023, the CPU 103 extracts maximum areas from among continuous areas having movement vectors equivalent to the above-described main object vectors, and treats the relevant areas and surrounding areas as a main object temporary area (an area 803a in an image 803 illustrated in FIG. 8). Further, the main object position in each image can be unified by performing position adjustment of images using the main object vectors.

In step S3024, the CPU 103 sets search areas for movement vector detection (areas 804a in an image 804 illustrated in FIG. 8) in the main object temporary area, and detects again movement vectors for respective search areas between images. In step S3023, the CPU 103 performs movement vector detection in smaller search areas than those in step S3021 to more finely classify movement vectors into the main object and background components. For example, the CPU 103 sets search areas having a size which is a vertically and horizontally half of those in step S3021.

In step S3025, the CPU 103 extracts maximum areas from among continuous areas having movement vectors of almost zero, and treats these areas as main object vector areas 805a in an image 805 illustrated in FIG. 8.

In step S3026, similar to step S3014, the CPU 103 also performs blurring processing on image data, as illustrated by the image 805, having values in areas with main object vectors. Similar to step S3014, step S3026 may also be omitted.

In step S302, as a result of the above-described image processing, the image 502 in FIG. 5 and the main object vector areas 805a illustrated in FIG. 8 are obtained. When the main object is at almost the same position between images, or when the same pattern is not repeated even with low-contrast objects, from the beginning, small search areas may be set in step S3021, and steps S3024 and S3025 may be omitted.

As described above, in the present exemplary embodiment, for a plurality of images captured by an imaging apparatus, main object areas are detected with high accuracy based on the camera movement, differences between images, and the movement vectors of the main object based on the camera movement. This makes it possible to recognize objects with high accuracy in imaging by a moving imaging apparatus.

In the present exemplary embodiment, the main object and background components are separated with high accuracy, enabling generation of a panning shot image with little sense of discomfort.

In the present exemplary embodiment, the angular velocity detected by the angular velocity sensor 105 is used as the method of position adjustment in step S3011. An advantage of using the angular velocity is that object-independent detection is made possible. This detection method enables detection even when it is difficult to determine the movement amount of the background based on images, for example, in the case of high object moving speed and a remarkably large change amount of the background, in the case of low-contrast objects, or in the case of repetition of the same pattern. Meanwhile, a certain amount of offset is produced since the angular velocity sensor 105 is used. Therefore, it is difficult to perform accurate position adjustment. In addition, a cost increase arises as a problem. As described above, there is also a method for using movement vectors instead of the angular velocity. This method has contrasting features with those of the method with the angular velocity. Since movement vectors are not affected by offset, the method provides both accurate position adjustment and low cost. On the other hand, when it is difficult to determine the movement amount of the background based on images, a possibility of erroneous detection of movement vectors increases, resulting in position adjustment at incorrect positions. As described above, the angular velocity may be combined with movement vectors. For example, it is also possible to set an index of reliability caused by repetition of the same pattern or low contrast to movement vectors, and use movement vectors when the reliability is high and use the angular velocity when the reliability is low. There is also provided a method of detecting movement vectors with high accuracy by restricting the movement vector detection range by using the movement amount of the background calculated based on the angular velocity.

Figure 10:
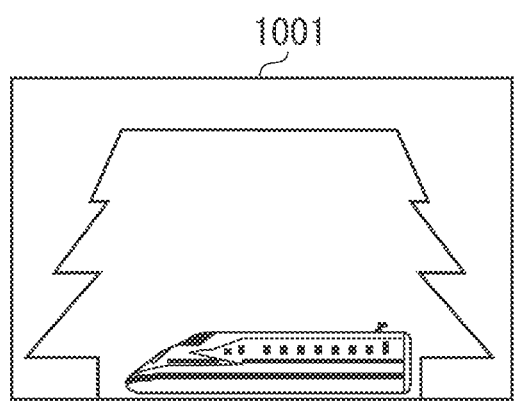
FIG. 10 illustrates an example of panning shot image according to the first exemplary embodiment.

FIG. 10 illustrates a combined image generated in the above-described exemplary embodiment. An image 1001 is generated by combining the images 501, 502, and 503 illustrated in FIG. 5 in the above-described steps. The image 1001 includes a clearly captured vehicle as a moving object or a main object, and a moving tree as the background.

In the present exemplary embodiment, a panning shot image is generated by using a plurality of images continuously captured by the imaging apparatus 100. However, the processing is not limited thereto. For example, a panning shot image can also be generated by processing a plurality of recorded images captured in time series, by using a PC as an image processing apparatus. In this case, the camera movement information used for estimating the movement amount of the background is preferably stored in association with recorded images or headers of images to be recorded.

The object of the present invention can also be achieved by the following processing. Specifically, a storage medium storing a program code or software describing procedures for implementing the functions of the above-described exemplary embodiment are supplied to a system or an apparatus. Then, a computer (or a CPU or a micro-processing unit (MPU)) of the system or the apparatus reads and executes the program code stored in the storage medium.

In this case, the program code itself read from the storage medium implements new functions of the present invention, and hence the storage medium storing the program code and the program constitute the present invention.

As a storage medium for supplying the program code, for example, a flexible disk, a hard disk, an optical disc, a magneto-optical disk, etc. can be used. A compact disc read only memory (CD-ROM), a compact disc recordable (CD-R), a compact disk rewritable (CD-RW), a digital versatile disc read only memory (DVD-ROM), a digital versatile disc random access memory (DVD-RAM), a digital versatile disc rewritable (DVD-RW), a digital versatile disc recordable (DVD-R), a magnetic tape, a nonvolatile memory card, a read only memory (ROM), etc. can also be used.

The functions of the above-described exemplary embodiment are implemented by executing the program code read by the computer. The present invention further includes a case where an operating system (OS) operating on the computer executes a part or whole of actual processing based on instructions of the program code, and the functions of the above-described exemplary embodiment are implemented by the relevant processing.

The present invention further includes the following case. The program code read from the storage medium is written to a memory included in a function expansion board inserted into the computer or a function expansion unit connected to the computer. Then, based on instructions of the program code, a CPU included in the expansion board or the function expansion unit executes a part or whole of actual processing.

The present invention is applicable not only to an apparatus with imaging as a main purpose, such as a digital camera, but also to an arbitrary apparatus including an imaging apparatus or having an imaging apparatus externally connected thereto, such as a mobile phone, a PC (laptop type, desktop type, and tablet type), and a game machine. Therefore, the "imaging apparatus" according to the present specification includes an arbitrary electronic apparatus provided with the imaging function.

OTHER EMBODIMENTS

Embodiments of the present invention can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-136921 filed Jun. 28, 2013, which is hereby incorporated by reference herein in its entirety.

What is claimed is:
1. An image processing apparatus comprising;
one or more processors; and
a memory storing instructions which, when executed by the processors, cause the information processing apparatus to function as:
a calculation unit configured to calculate movement vectors for respective areas on a plurality of images;

a detection unit configured to detect areas that have changed between the plurality of images, based on their differences;

an estimation unit configured to estimate areas where a moving object exists, in the plurality of images based on movement vectors for respective areas calculated by the calculation unit; and an identification unit configured to identify moving object areas based on the changed areas detected by the detection unit and the areas estimated by the estimation unit;

wherein the detection unit identifies a background of the plurality of images and detects the changed areas from among the plurality of images having undergone position adjustment with reference to a position of the background.

2. The image processing apparatus according to claim 1, wherein the identification unit identifies, as moving object areas, the changed areas detected by the detection unit and the areas estimated by the estimation unit.

3. The image processing apparatus according to claim 1, wherein a size of areas for obtaining differences between images by the detection unit is smaller than a size of areas for obtaining movement vectors by the calculation unit.

4. The image processing apparatus according to claim 1, wherein the detection unit identifies a background of the plurality of images by using the movement vectors for respective areas calculated by the calculation unit.

5. The image processing apparatus according to claim 4, wherein the calculation unit calculates a histogram for the movement vectors for respective areas, wherein the detection unit identifies the background based on the histogram, and wherein the estimation unit estimates the areas where the moving object exists based on the histogram.

6. The image processing apparatus according to claim 5, wherein the detection unit identifies the background by using motion information based on information from a unit for detecting the motion of an imaging unit which captured the plurality of images.

7. The image processing apparatus according to claim 6, wherein the unit for detecting the motion of the imaging unit is a gyro sensor or an acceleration sensor.

8. The image processing apparatus according to claim 4, further comprising:

an imaging unit; and a unit configured to detect motion of the imaging unit.

9. The image processing apparatus according to claim 1, wherein the estimation unit detects from among the movement vectors for respective areas calculated by the calculation unit, as movement vectors corresponding to moving object areas, movement vectors existing in a range having a size determined by motion information corresponding to information received from a sensor for detecting the motion of an imaging unit which captured the plurality of images and estimates the moving object areas.

10. The image processing apparatus according to claim 1, wherein the estimation unit estimates the moving object areas based on a histogram of the movement vectors.

11. The image processing apparatus according to claim 1, wherein, for continuously captured three images, the detection unit generates difference images formed of differences between an intermediate image and two other images, and performs an AND operation on two relevant difference images to detect the changed areas.

12. The image processing apparatus according to claim 1, wherein the estimation unit, after estimating the areas where the moving object exists, by using the movement vectors obtained by the calculation unit, detects movement vectors for smaller areas in the areas where the estimated moving object exists, and estimates the moving object areas.

13. The image processing apparatus according to claim 1, further comprising a combination unit configured to perform position adjustment on the plurality of images with reference to the moving object areas, and combine the plurality of images.

14. The image processing apparatus according to claim 13, wherein the image combined by the combination unit generates a combined image in which areas other than the identified moving object areas are blurred.

15. The image processing apparatus according to claim 1, wherein the detection unit identifies the background by using the movement for respective areas calculated by the calculation unit.

16. A method for controlling an image processing apparatus, the method comprising:

causing a calculation unit to calculate movement vectors for respective areas on a plurality of images;

causing a detection unit to detect areas that have changed between a plurality of images based on differences between the plurality of images;

causing an estimation unit to estimate areas where a moving object exists in the plurality of images based on the movement vectors for respective areas calculated by the calculation unit; and causing an identification unit to identify moving object areas based on the changed areas detected by the detection unit and the areas estimated by the estimation unit;

wherein the detection unit identifies a background of the plurality of images and detects the changed areas from among the plurality of images having undergone position adjustment with reference to a position of the background.

17. A non-transitory computer-readable storage medium storing computer executable instructions for causing a computer to execute each step of the image processing method according to claim 16.

18. An image processing apparatus comprising;

a calculation unit configured to calculate movement vectors for respective areas on a plurality of images;

one or more processors; and a memory storing instructions which, when executed by the processors, cause the information processing apparatus to function as:

a detection unit configured to detect areas that have changed between the plurality of images, based on their differences;

an estimation unit configured to estimate areas where a moving object exists, in the plurality of images based on movement vectors for respective areas calculated by the calculation unit; and an identification unit configured to identify moving object areas based on the changed areas detected by the detection unit and the areas estimated by the estimation unit;

wherein a size of areas for obtaining differences between images by the detection unit is smaller than a size of areas for obtaining movement vectors by the calculation unit.

19. A method for controlling an image processing apparatus, the method comprising:

causing a calculation unit to calculate movement vectors for respective areas on a plurality of images;

causing a detection unit to detect areas that have changed between a plurality of images based on differences between the plurality of images;

causing an estimation unit to estimate areas where a moving object exists in the plurality of images based on the movement vectors for respective areas calculated by the calculation unit; and causing an identification unit to identify moving object areas based on the changed areas detected by the detection unit and the areas estimated by the estimation unit;

wherein a size of areas for obtaining differences between images by the detection unit is smaller than a size of areas for obtaining movement vectors by the calculation unit.

* * * * *